United States Patent
De Sousa et al.

(10) Patent No.: US 8,276,120 B2
(45) Date of Patent: Sep. 25, 2012

(54) RECONFIGURABLE COPROCESSOR ARCHITECTURE TEMPLATE FOR NESTED LOOPS AND PROGRAMMING TOOL

(75) Inventors: Jose Teixeira De Sousa, Lisbon (PT); Victor Manuel Goncalves Martins, Lisbon (PT); Nuno Calado Correia Lourenco, Lisbon (PT); Alexandre Miguel Dias Santos, Lisbon (PT); Nelson Goncalo Do Rosario Ribeiro, Lisbon (PT)

(73) Assignee: Coreworks, S.A., Lisboa (PT)

( * ) Notice: Subject to any disclaimer, the term of this patent is extended or adjusted under 35 U.S.C. 154(b) by 1022 days.

(21) Appl. No.: 12/247,638

(22) Filed: Oct. 8, 2008

(65) Prior Publication Data

US 2009/0113405 A1 Apr. 30, 2009

Related U.S. Application Data

(60) Provisional application No. 60/983,798, filed on Oct. 30, 2007.

(51) Int. Cl.
*G06F 9/44* (2006.01)

(52) U.S. Cl. ......... 717/121; 717/120; 717/132; 717/133

(58) Field of Classification Search .................. None
See application file for complete search history.

(56) References Cited

U.S. PATENT DOCUMENTS 7,996,827 B2 * 8/2011 Vorbach et al. ............... 717/149
8,006,204 B2 * 8/2011 Killian et al. .................. 716/100

* cited by examiner

*Primary Examiner* — Chuck Kendall
(74) *Attorney, Agent, or Firm* — Kenealy Vaidya LLP

(57) ABSTRACT

The exemplary embodiment is for an architecture integrated in a generic System on Chip (SoC) and consisting of reconfigurable coprocessors for executing nested program loops performed in a functional unit array in parallel. The data arrays are accessed from one or more system inputs and from an embedded memory array in parallel. The processed data arrays are sent back to the memory array or to system outputs and enable the acceleration of nested loops. The coprocessors are connected either synchronously or using asynchronous first in first out memories (FIFOs), forming a globally asynchronous locally synchronous system and each coprocessor can be programmed by tagging and rewriting the nested loops in the original program and produces a coprocessor configuration per each nested loop group, which is replaced in the original code with coprocessor input/output operations and control.

29 Claims, 16 Drawing Sheets

RECONFIGURABLE COPROCESSOR ARCHITECTURE TEMPLATE FOR NESTED LOOPS AND PROGRAMMING TOOL

This application claims the priority benefit under 35 U.S.C. §119 of U.S. Provisional Patent Application No. 60/983,798, filed on Oct. 30, 2007, which is hereby incorporated in its entirety by reference.

FIELD OF THE INVENTION

This invention relates in general to computer architecture and in particular to acceleration of nested loops in algorithms.

BACKGROUND OF THE INVENTION

Computing devices are becoming ubiquitous and many electronic devices can now be found amongst the objects carried by people in their everyday life: mobile phones, personal digital assistants, portable audio players.

These objects have been enabled by embedded processors which follow the same computing paradigm known as von Neumann's architecture. As embedded devices become more complex they require faster and faster clock frequencies and consume more and more power. This is because conventional processors execute instructions sequentially and fetch data also sequentially. For battery powered devices the von Neumann computing paradigm cannot be sustained and alternatives must be found.

Recently there has been great interest in more parallel architectures to face the demanding computational needs of multimedia and communications algorithms. Application specific integrated circuits (ASICs) have been used to increase the number of operations done in parallel in critical parts of the algorithms, thus avoiding increasing the clock frequency and therefore keeping the energy consumption within practical limits. However, ASICs have long development times, and once fabricated they cannot be changed. This is incompatible with fast changing market dynamics and the short lifespan of modern electronics.

Programmable solutions are in effect more desirable and this is how the technology of Reconfigurable Computing came into existence. A reconfigurable computer is a machine whose architecture can be changed at post-silicon time by changing the contents of configuration memories. The essential element of a reconfigurable computer is a programmable multiplexer (FIG. 1). The programmable multiplexer has inputs A and B, an output C and a configuration bit S. If S is set to 0 a path is created from A to C; if S is set to 1 a path is created from B to C. Having enough programmable multiplexers enables functional units and memory elements to be interconnected at will, creating different hardware architectures on-the-fly, for better executing different algorithms. The present invention is a template for deriving a class of reconfigurable architectures.

Existing reconfigurable architectures can be divided in two main kinds: (1) fine-grained arrays and (2) coarse-grain arrays.

Fine-grain arrays have gained widespread popularity in the form of Field Programmable Gate Arrays (FPGAs). An FPGA is a large array of small programmable functional units for performing logic functions on narrow bit slices interconnected by a large network of programmable switches. The functional units are essentially programmable Look-Up-Tables (LUTs) and the network of switches consists of the programmable multiplexers described above. Commercial FPGA devices are available through companies like Xilinx, Altera, Actel, Lattice, etc. Although FPGAs enable creating circuits on demand by electrical programming, the rich array of LUTs and routing switches represent a huge area and power penalty: the same circuits implemented in dedicated hardware would be much smaller and less energy hungry. Therefore, the use of FPGAs in battery operated devices has been the exception rather than the rule.

FPGAs have been combined with standard processors and specific blocks such as multipliers and embedded RAMs in order to mitigate the huge circuit areas required and improve performance. In this way, only the more specific and critical parts of the algorithms are run on the reconfigurable fabric, whereas other less critical parts are run on the embedded processors. Examples of such hybrid architectures have been proposed by some researchers [4-16-11] and introduced in the market by FPGA vendors. However, these circuits are still wasteful in terms of silicon area and slow in terms of clock frequencies and configuration times.

Coarse-grain arrays overcome the mentioned limitations of fine-grain arrays at the cost of reduced flexibility and generality. Coarse-grain arrays have been the object of recent research with quite a few architectures being proposed by researchers [3-6-12-5-7-8-10-9-13-2-14-17] and startup companies [18-19]. These arrays have functional units of higher granularity and less complex interconnection networks to better target DSP applications such as multimedia and communications. The functional units normally perform arithmetic and logic operations on words of a few bytes rather than on slices of a few bits. The result is a less general but much more compact and faster reconfigurable system, requiring small amounts of configuration data, which can be agilely and partially swapped at run time.

Another important aspect is how reconfigurable units are coupled with embedded microprocessors. Initially reconfiguration began at the processor functional unit level, and was triggered by special instructions [15-12-1]. Later, reconfigurable units became coprocessors tightly coupled with processors and still requiring special instructions in order to work [4-16-3-6-12]. More recently, coprocessors attached to system busses and requiring no extensions of the host processor instruction set have become a major research topic [2-7-17]. Our work fits into the latest category.

The work in [2] presents a self-timed asynchronous data-driven implementation, which, given the difficulties of the timing scheme adopted, needed a full custom silicon implementation, somewhat impractical to use in a standard cell based technology. The architecture features two address generation processors, which run microcode instructions to create the needed sequence of memory addresses.

The architecture in [7] uses undifferentiated 8-bit functional units, including LUT-based multipliers, which are difficult to scale to 16-bit or 32-bit data words used in most multimedia and communications applications. The hierarchical interconnection scheme is structured enough to facilitate compilation. However, this work represents a single architecture design rather than an architecture template adaptable and scalable for various applications.

The work closest to ours is the one described in [17]: an architecture template consisting of an array of coarse-grain functional units interconnected to a set of embedded memories and address generation modules. The address generation modules are implemented with cascaded counters which feed a series of arithmetic and logic units (ALUs) and multipliers for the generation of complex address sequences. A set of delay lines synchronize the control of functional units and memory operations.

In our approach the address generation blocks are implemented with programmable accumulators, reducing the complexity of the hardware compared to using ALUs and multipliers. Instead of multiplying delay lines for synchronization, we use a single delay line and multiple counters with programmable wrap around times to generate groups of enable signals with different delays. In this way, the generation of some addresses can be delayed relatively to others, enabling the execution of loop bodies expressed by unbalanced pipeline graphs. The enable signals accompany the data signals through each functional unit, so they arrive with the needed delay at the next functional unit.

Our approach explicitly structures the interconnection networks (partial crossbars) to facilitate the operation of our programming tool. In fact the architecture template and the programming tool have been co-designed to avoid creating hardware structures whose programming is difficult or intractable to automate.

We also consider data sources and data sinks which are not necessarily the data inputs and outputs of embedded processor. The origin and destination of the data may be any piece of hardware in the system, not necessarily synchronous to the system clock. For that purpose we provide an interface simpler than processor busses, and we use asynchronous FIFOs to connect the core to other cores running at a different clock speed.

SUMMARY OF THE INVENTION

The architectures derived from the proposed template are integrated in a generic System on Chip (SoC) and consist of reconfigurable coprocessors for executing nested program loops whose bodies are expressions of operations performed in a functional unit array. The functional units must be able to perform the atomic operations indicated in the expressions. The data arrays are accessed in parallel from one or more system inputs and from an embedded memory array. The processed data arrays are sent back to the memory array or to system outputs.

The architectures enable the acceleration of nested loops compared to execution on a standard processor, where only one operation or datum access can be performed at a time. The invention can be used in a number of applications especially those which involve digital signal processing such as multimedia and communications. The architectures are used preferably in conjunction with von Neumann processors which are better at implementing control flow. The architectures feature an addresses generation block able to create complex sequences of addresses. The configuration register file store the information for programming the data path and the address generation block. The configuration register file is addressable, so the system can be partially and runtime reconfigurable.

The architectures loop for the programmed number of iterations or until some conditions pre-programmed in the functional units are flagged. Initialization is done using a control register, polling is possible using a status register and requests are served upon assertion of a request signal.

The architectures can be scaled easily in the number of data stream inputs, outputs, embedded memories, functional units and configuration registers.

We envision computational systems entailing several general purpose processors and several coprocessors derived from the proposed architectural template. The processors and coprocessors are connected either synchronously or using asynchronous first in first out memories (FIFOs), forming a globally asynchronous locally synchronous system.

Each coprocessor is programmed by tagging and rewriting the nested loops in the original processor code. The programming tool produces a coprocessor configuration per each nested loop group, which is automatically replaced in the original code with coprocessor input/output operations and control.

The available hardware in the coprocessor is modeled as a hardware graph. The expressions in loop bodies are modeled as data flow graphs. The source nodes of the data flow graph are memory outputs or system inputs and the sink nodes are memory inputs or system outputs. The expressions in the array addresses are modeled as address flow graphs. The address flow graphs continue the data flow graphs from memory ports, through address generation nodes, finally to timing nodes, forming a complete system graph.

The timing information for the generation of addresses can be extracted from the system graph. The timing information is sent along with the data in the form of enable signals, and used to synchronize the functional units.

The system graph is traversed from sinks to sources, in order to map the data flow and address flow graphs to the hardware graph, where the resources used are marked. Whenever there are multiple programmable multiplexer selections which result in different hardware resources being allocated to implement the intended flow, a decision is taken on what to try next. If after a decision the mapping becomes impossible the latest hardware mapping is undone. If there are alternative decisions, another decision is tried. If there are no more alternative decisions the previous decision is undone. This process continues until a mapping solution is found or the impossibility of mapping is proven. This procedure is exhaustive and complete.

DETAILED DESCRIPTION

A) Nested Loops

The coprocessors derived from the proposed architecture template are capable of manipulating n-bit data words. We distinguish between Constants: single data words read from a configuration register file Variables: single data words read from functional unit outputs Arrays: collection of data words read from memories The architectures are capable of executing one or more consecutive nested loop groups according to the following meta-language definitions:

```
{nested_loop_group}
//curled brackets indicates repetition
nested_loop_group ::=
//"::=" means definition
for(index=0; index<index_end; index++) \{
//index and index_end are integers
// '\' is an escape character removing the meta meaning of
// the next character
    {nested_loop_group;}
    {assignment_statement;}
    {break_statement;}
\}
assignment_statement::=
(variable | array_element) = expression
//'|' means exclusive or
array_element ::= array_name\[address_expression\]
address_expression ::=
(((address_expression | alpha) * index +
(address_expression | beta)) % modulo) + offset
//alpha, beta, modulo and offset are integers
expression ::=
F({(expression | array | variable | constant)})
//where F is a function computed by some functional unit
//given a list of inputs or arguments separated by blank
//spaces
break_statement ::= break( expression );
//causes execution to break if expression evaluates to non
//zero
```

B) Architecture

Figure 1:
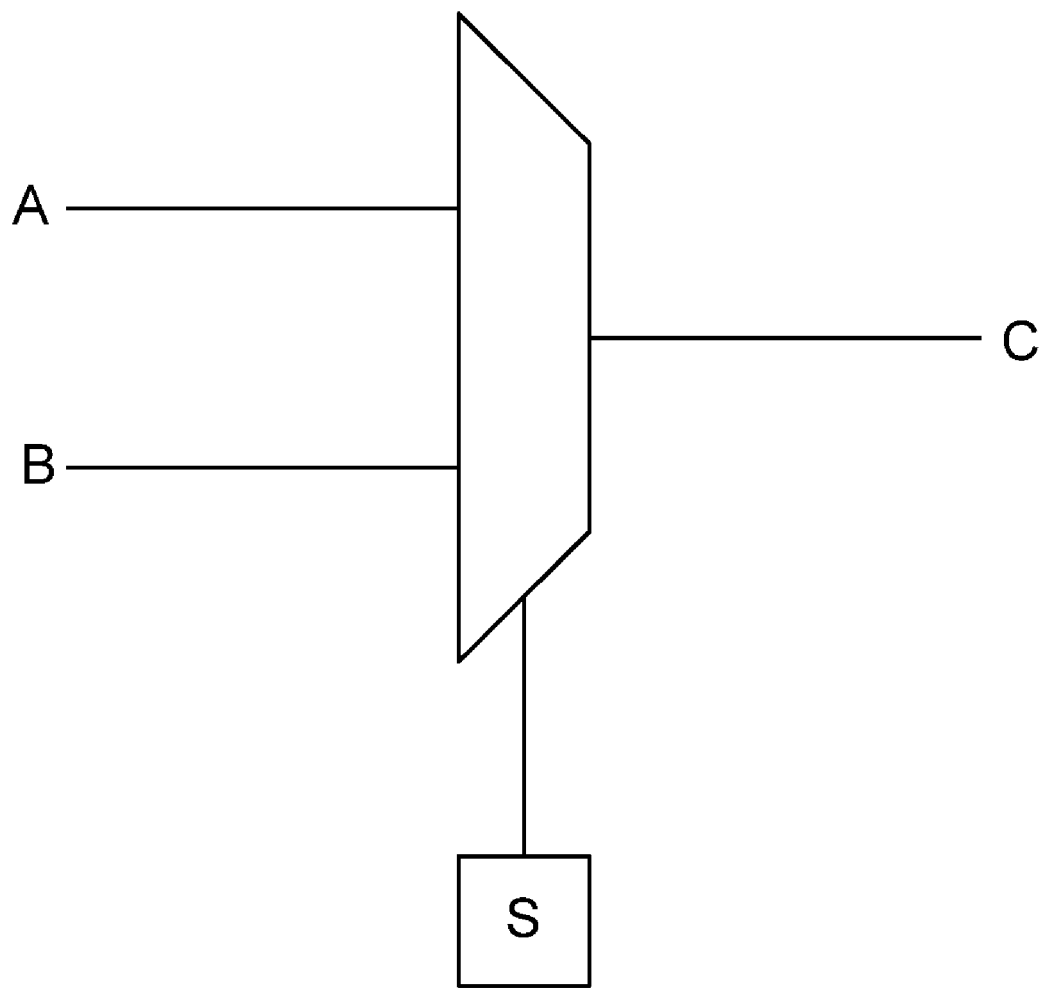
FIG. 1. Programmable multiplexer
Figure 2:
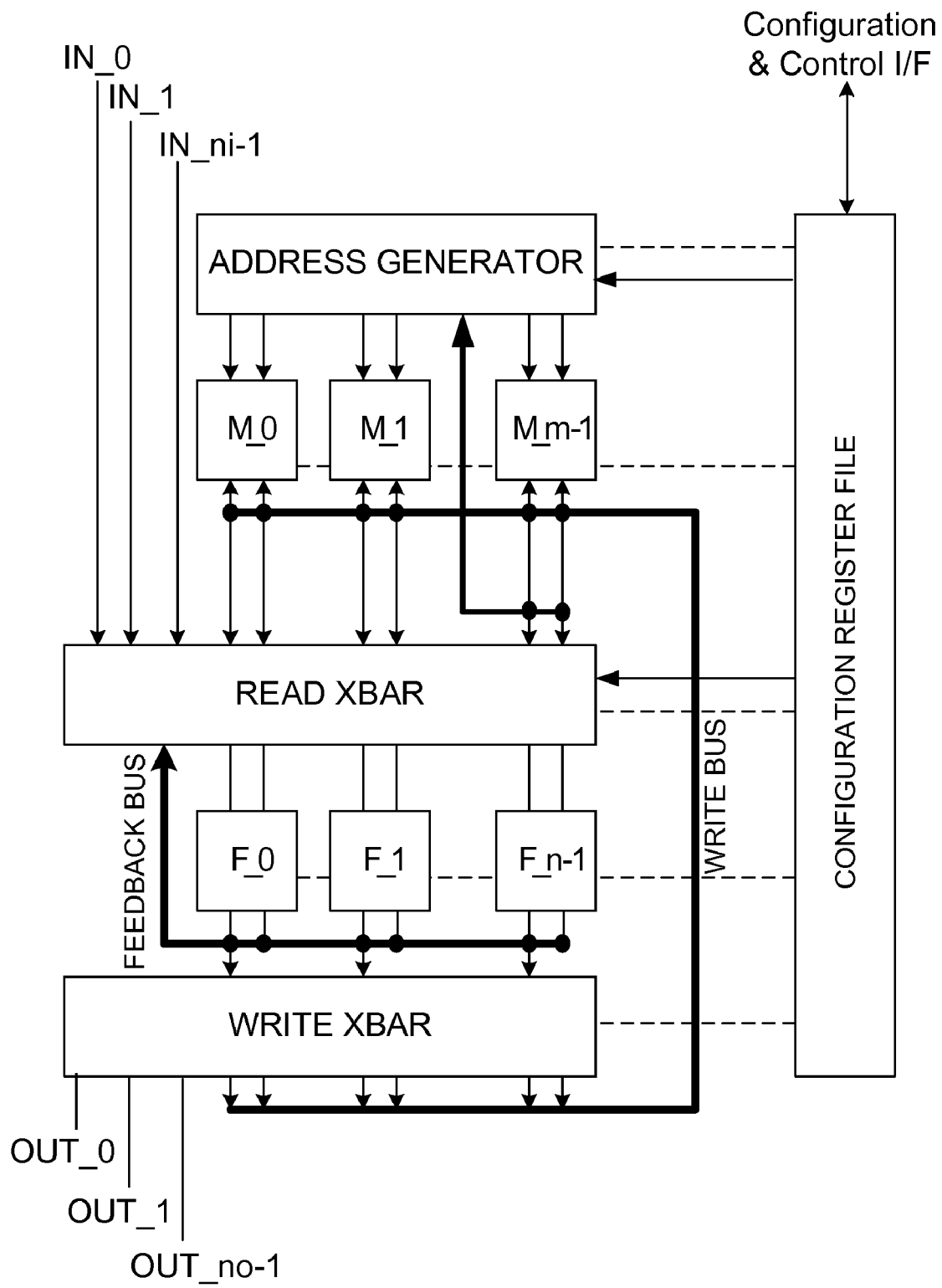
FIG. 2. Top level view of the coprocessor architecture template

The top-level view of the proposed architecture template is shown in FIG. 2. It basically consists of an array of functional units (FUs) and an array of embedded memories (EMs).

The data processed by the FUs are sourced from the EMs, system inputs or outputs of other FUs by the Read Crossbar. Each FU produces a single data output, but it may also produce some flags as a secondary output. These flags are routed by the Read Crossbar to other FUs where they are used as control inputs. The data processed by the FUs is written back to the EMs or sent out to system outputs using routes defined by the Write Crossbar.

The addresses of the memories come from the Address Generator. Since the memory bandwidth is crucial for the performance of this system, in FIG. 2 all embedded memories are shown as dual port memories. Single port memories could also be used.

A configuration register file holds a set of registers containing data that define the configuration of programmable FUs, read and write crossbars, and address generation blocks. It also stores some constants used in the computation of addresses and data. The configuration register file is accessed through a configuration interface which is also used for accessing control and status registers. The configuration register file is addressable, so the system can be partially and runtime reconfigurable.

Figure 3:
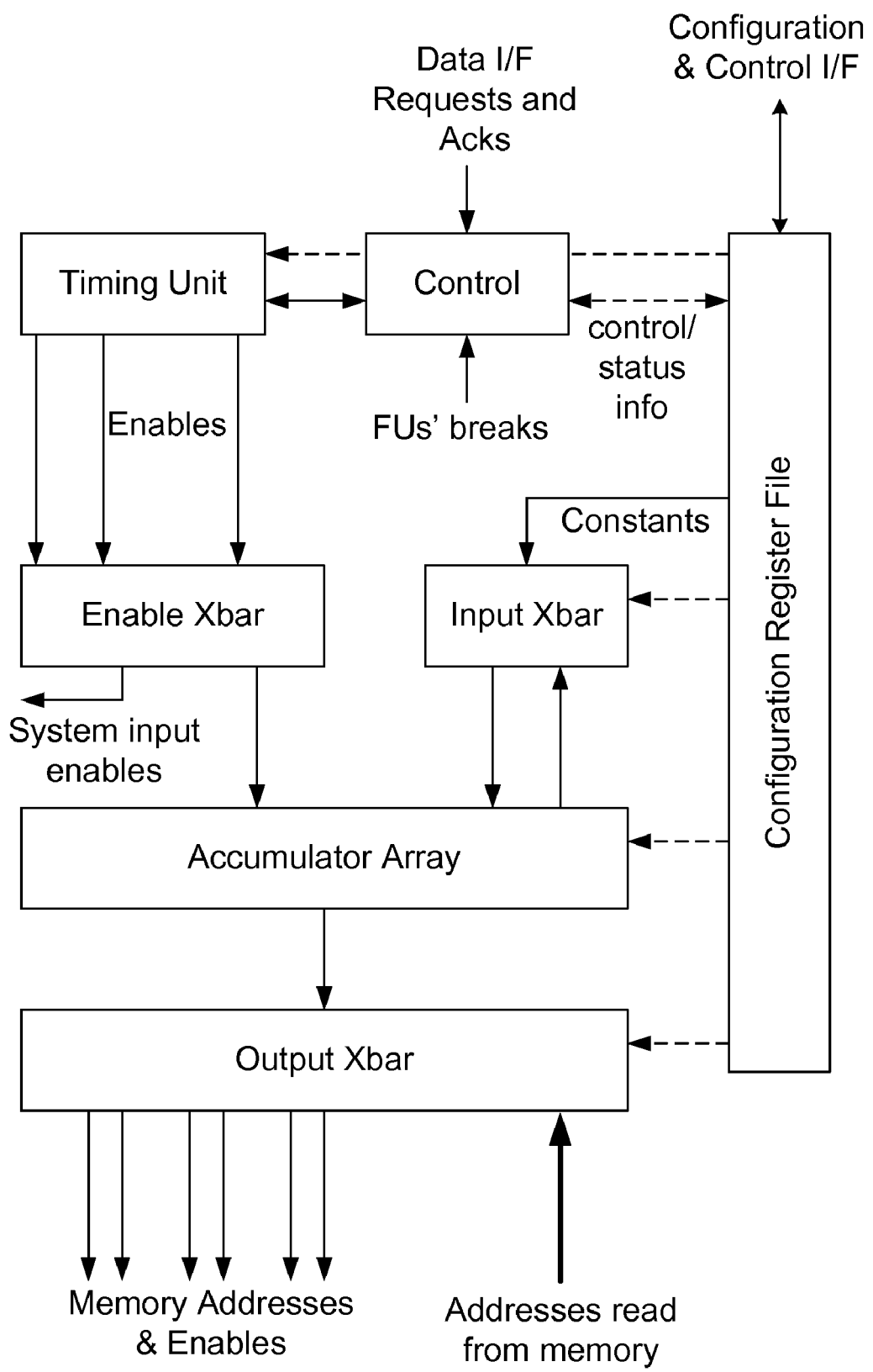
FIG. 3. Architecture of the address generation unit

The address generation block can be seen in FIG. 3. Its architecture resembles the top level view of the architecture itself, that is, it is like a smaller reconfigurable processor inside the reconfigurable processor. Instead of the FU array there is an Accumulator Array (AA), and the Read and Write crossbars appear as the Input Crossbar and Output Crossbar, respectively.

The AA contains a collection of special accumulators which are enabled by signals coming from the Timing Unit. Some accumulators produce addresses which are routed to the memory ports by the Output Crossbar. The Output Crossbar also routes addresses stored in certain memories to be used as addresses of other memories. This provides for extreme flexibility in the generation of addresses at the expense of memory space. Other accumulators produce intermediate values which are fed back into the AA itself. The Input Crossbar provides for the feeding back of the intermediate values and routes constants from configuration register to the accumulators, in order to generate complex address sequences.

The addresses are functions of the nested loop indices. The Timing Unit generates groups of signals for enabling the AA. The enable signals are routed to the AA by the Enable Crossbar. The Enable Cross bar also routes enable signals to the system inputs to time and synchronize the admission of external data. The enables of the accumulators accompany the generated address to its memory port; in case of a read port the enable signals accompany the data read from the memory through the FUs. In the FUs the enable signals are delayed by the same amount as the data so that enables and data remain synchronous.

The control block shown in FIG. 3 is responsible for responding to user commands to initialize, start and poll the coprocessor. It also stalls the coprocessor in case some condition is detected in the functional units, or in case the system inputs are data starving or the outputs are overflowed.

The loop indices advance by unit increments as given above in the nested loop syntax. Each nested loop group uses a group of indices implemented in the Timing Unit using cascaded counters where the end count value is programmed.

Figure 4:
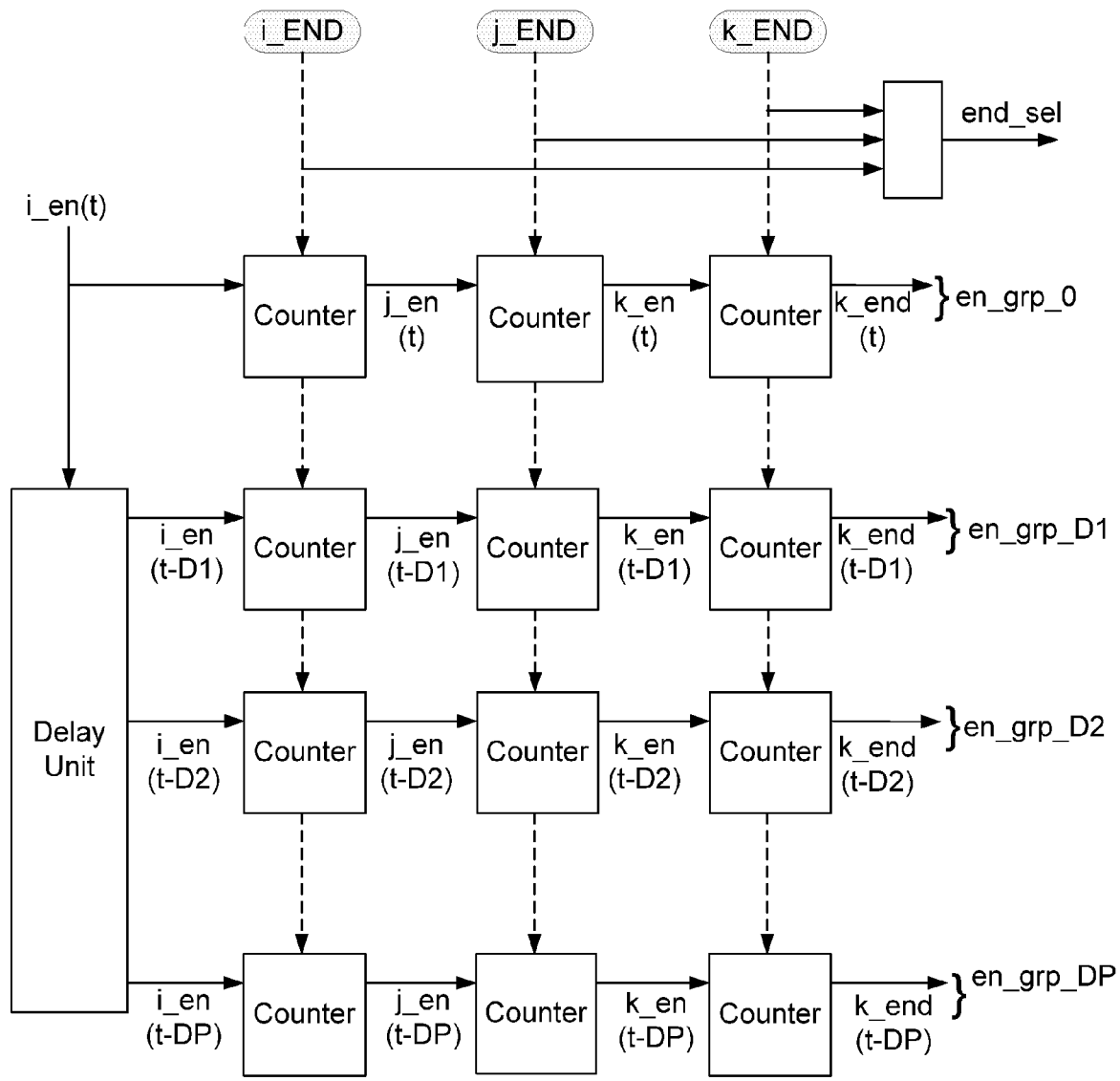
FIG. 4. Timing unit matrix

The Timing Unit is shown in FIG. 4. The programmable counters are interconnected in a matrix where the first row implements enable signals for the loop indices i, j and k. The subsequent rows produce delayed versions of the loop indices. The last row always contains the most delayed version of the loop indices. The first counter represents index i and is incremented at every clock cycle. When a counter reaches the end value it wraps around and pulses the output signal to advance the next outer counter by one. When the final counter reaches the end the outmost loop finishes and the nested loop group is done. A priority encoder identifies the outmost loop (end_sel) from the non null end count values programmed in the cascaded counters. This information will indicate which counter column terminates the processing and will be used in the control block.

Figure 5:
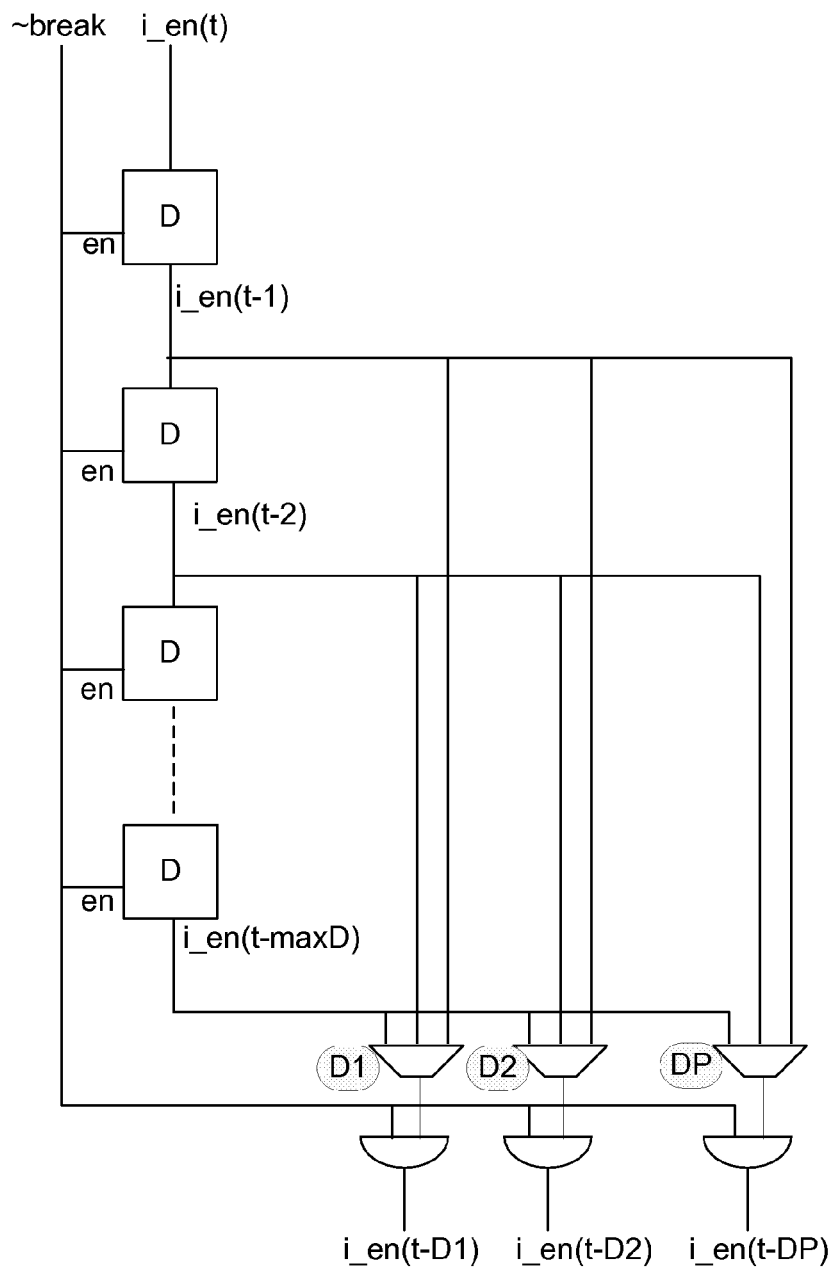
FIG. 5. Delay unit

The circuit to delay the basic index i enable by programmable values is shown in FIG. 5. Each flip-flop D delays the i_en(t) signal by one cycle. Programmable multiplexers select the delay wanted. If there is a break condition (see below) the state of the delay unit is frozen by disabling the flip-flops and masking the output enables. If there are P memory ports in the system at most P different delayed versions of the enables are needed. In practice a lower number of delayed versions may be implemented.

Figure 6:
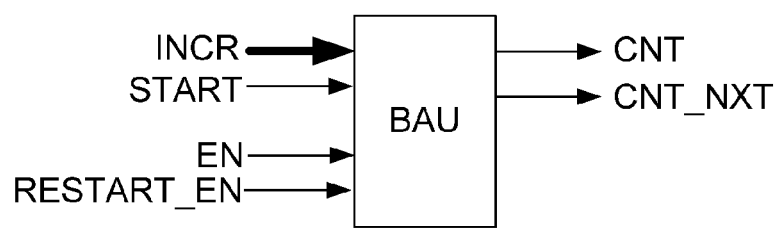
FIG. 6. Basic accumulator unit

Since real addresses do not advance necessarily by increments of one, the accumulator units shown in FIG. 6 and FIG.

7 are responsible for generating more complex address sequences of the form given by address_expression as above.

The Basic Accumulator Unit (BAU) shown in FIG. 6 initializes to the value specified by the START input after the RESTART_EN signal is pulsed, and accumulates the values specified by the INCR input. The accumulator current and next outputs are given by signals CNT and CNT_NXT, respectively.

Figure 7:
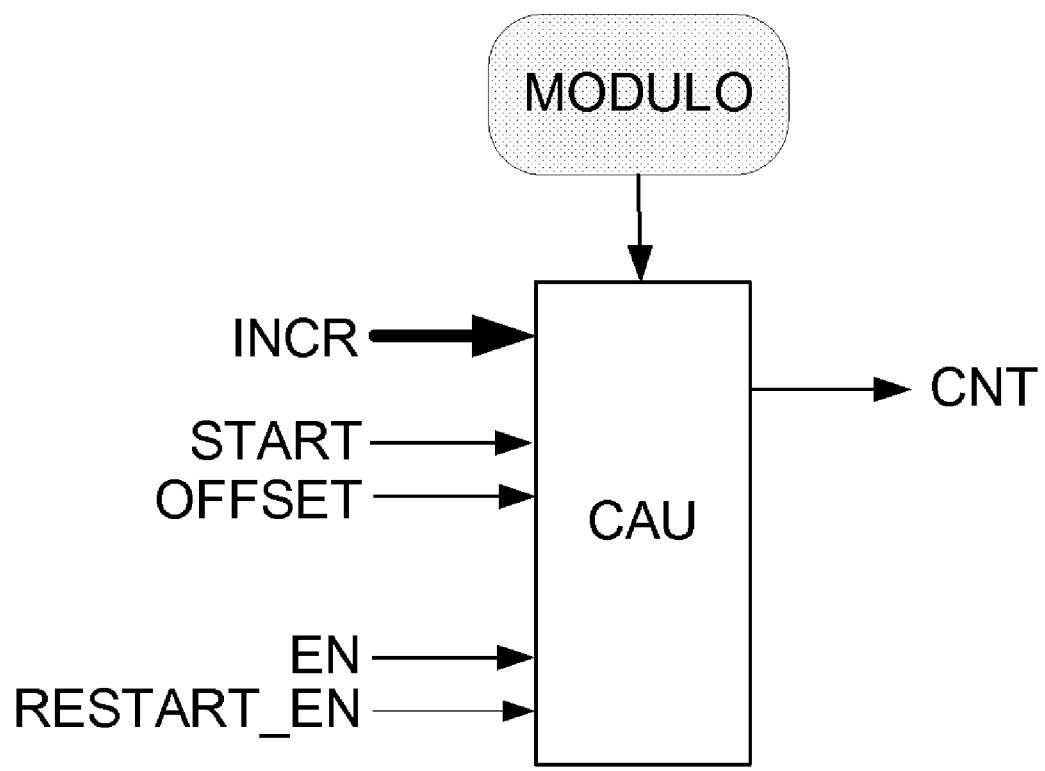
FIG. 7. Complex accumulator unit

The Complex Accumulator unit shown in FIG. 7 adds the following functionality to the BAU: the accumulations are done in modulo specified by the configuration input MODULO, and added to the value specified by the OFFSET input signal.

Figure 8:
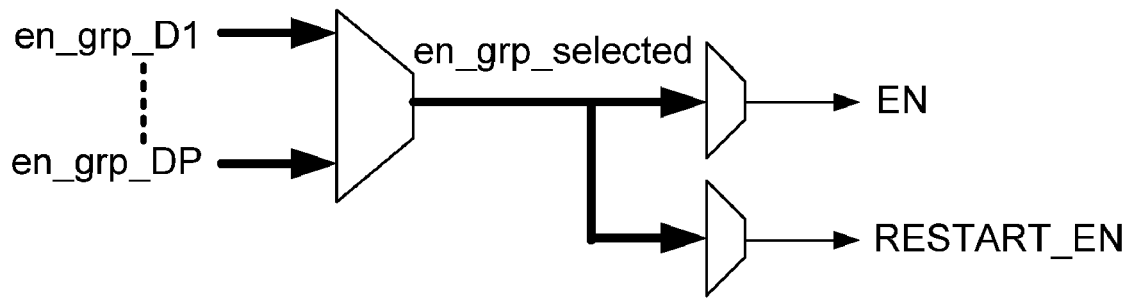
FIG. 8. Selection of the accumulator Enable and Restart Enable signals in the Enable Crossbar FIG. 9. Selection of the Start, Increment and Offset signals for each accumulator unit in the Input Crossbar FIG. 10. Selection of the memory port address from the accumulator Count signals in the Output Crossbar FIG. 11. Selection of the signals for functional unit inputs FIG. 12. Selection of system outputs and memory inputs FIG. 13. Control/configuration, data in and data out interfaces FIG. 14. Control register FIG. 15. Status Register FIG. 16. Control circuit FIG. 17. Selection of break conditions issued by functional units FIG. 18. Selection of the I/O dependent system enable FIG. 19. Coprocessor programming flow FIG. 20. Data flow graph example FIG. 21. Addresses flow graph example

Each accumulator selects its EN and RESTART_EN signals from the Enable Crossbar, which is driven by the enable signal groups produced in the Timing Unit. As shown in FIG. 8, first the enable group (delayed version) is selected and then the enable signals for EN and RESTART_EN are selected from within the selected group. A similar scheme is used to select the enable signals used to acknowledge the admission of external data in the system. In this way the input of external data can be timed and synchronized.

Figure 9:
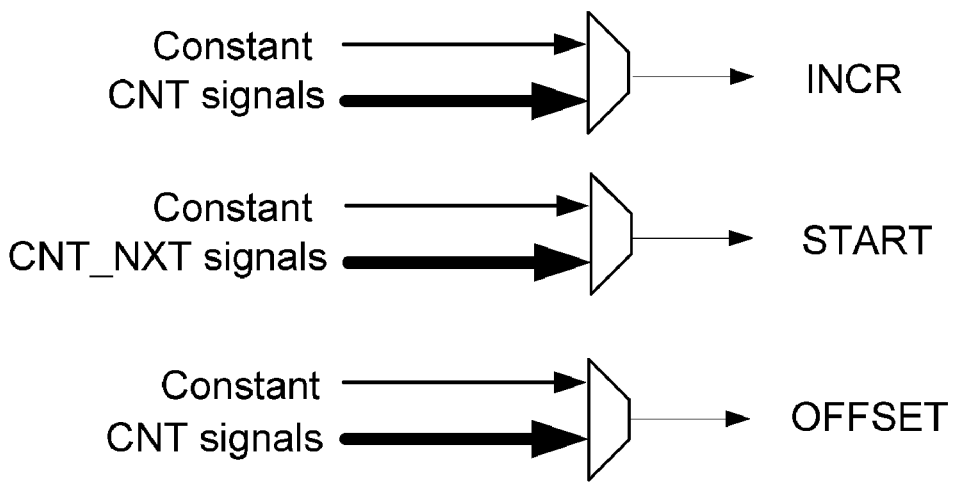

FIG. 9 illustrates the selection of the accumulator inputs from the Input Crossbar. The START, OFFSET and INCR signals can be chosen either from constants stored in the configuration registers or from the CNT and CNT_NXT signals produced by other accumulators.

Figure 10:
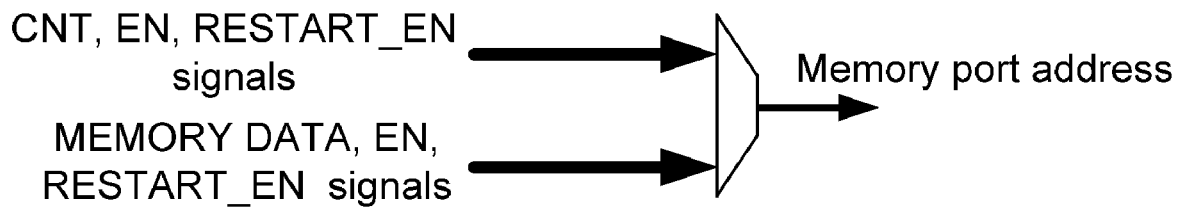

FIG. 10 illustrates the selection of memory port addresses in the Output Crossbar. The CNT signals produced by the accumulators or data read from memories can be chosen to form the addresses of memory ports. The EN and RESTART_EN signals of the accumulators follow the produced addresses to the memory ports. If the memory port is a read port the enables accompany the data read to the functional units, or, if the data read is to be used as an address, the enables follow the data back to the Output Crossbar. If the memory port is a write port the EN and RESTART_EN signals are ignored.

Figure 11:
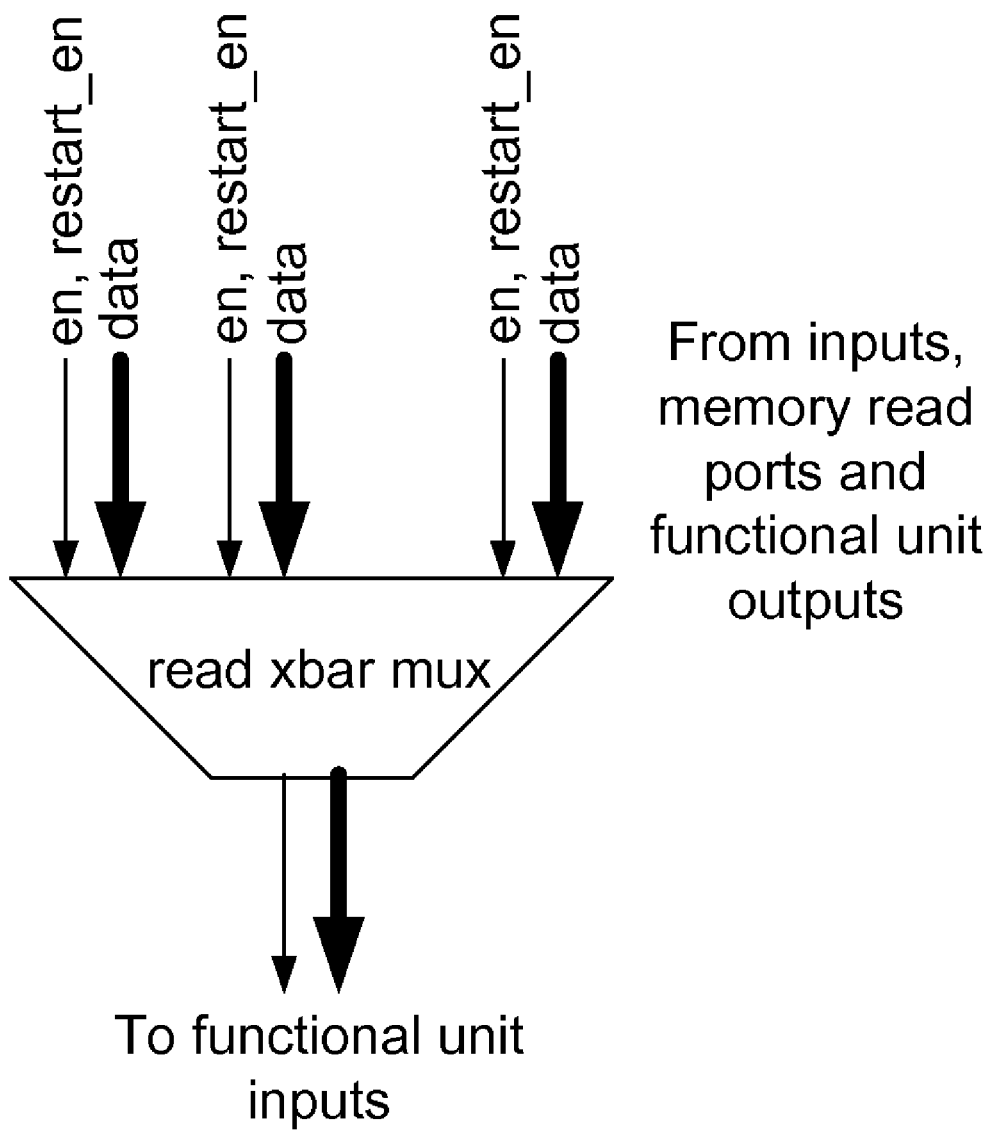

FIG. 11 shows the selection of inputs for functional units by means of the Read Crossbar. Inputs can come from system inputs, memory output ports, or from the outputs of other functional units. This architecture template considers that any functional unit must have a special input responsible for passing the enable signals through to the next functional unit and delaying them the same number of latency cycles as the functional unit itself. In this way the enable signals are preserved and kept near the data they refer to. Functional units may be configured to route the input RESTART_EN signal to the output EN signal while losing the EN signal of the input, which ceases to be relevant from that functional unit on. The usefulness of doing so will be apparent later.

Figure 12:
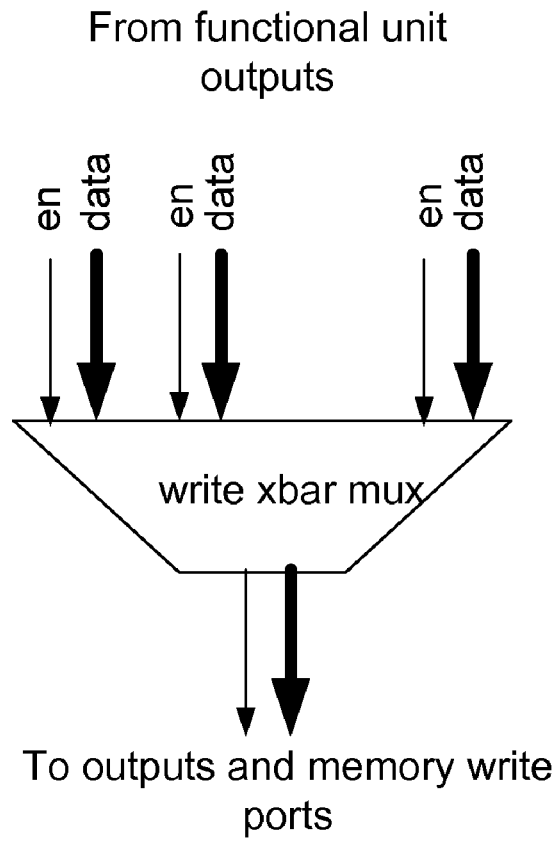

FIG. 12 shows the selection of system outputs and memory inputs in the Write Crossbar. These are selected from functional unit outputs. Note that the enables accompany the data and are to be used as memory write enables or output request signals.

Figure 13:
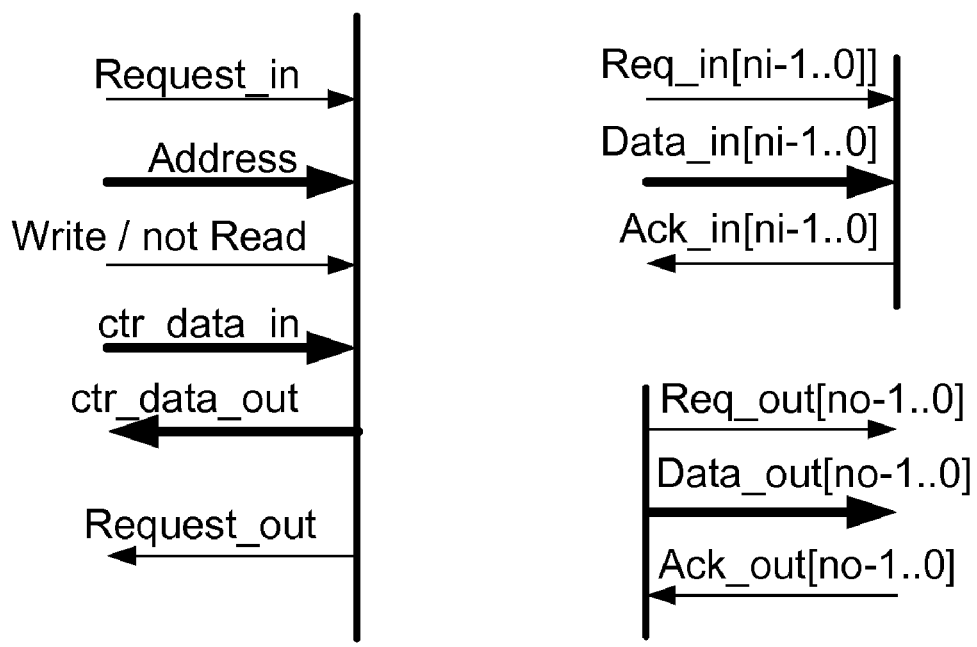

The control/configuration, data in and data out interfaces are shown in FIG. 13.

The control/configuration interface has a Request_in input signal to indicate it is being selected and to validate the Address input vector, which is used to select internal registers. The Write/not Read signal chooses the intended action. The data is written to ctr_data_in ports and read from the ctr_data_out port. The Request_out signal flags events such as the end of processing or that some condition has been detected and the coprocessor has been halted.

The data in interface has a Req_in input signal vector. Each element Req_in[i] indicates that the data in interface i is being selected and validates the Data_in[i] vector containing the input data. The Ack_in[i] signal is used to tell the core driving interface I that the request Req_in[i] to read Data_in[i] has been accepted and executed. The Ack_in[i] signal comes from the Address Generator block, where it is selected by the Enable Crossbar.

The data out interface has a Req_out output signal vector. Each element Req_out[i] indicates that the data out interface i is being selected and validates the Data_out[i] vector containing the output data. Upon accepting the data sent out by this interface an acknowledge signal Ack_out[i] must be asserted from the outside or otherwise the coprocessor will stall to prevent data loss. From an external point of view, Ack_out[i] should always be asserted unless it was impossible to accept the data from the last request.

Figure 14:
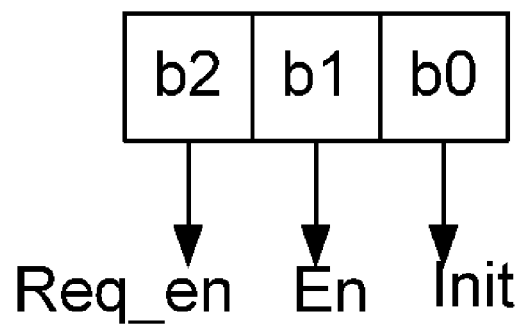

FIG. 14 shows a basic control register for the architectures. It contains three bits: the Init bit to initialize the coprocessor, the En bit to enable the coprocessor and the Req_en enable control requests from the co-processor by means of signal Request_out.

Figure 15:
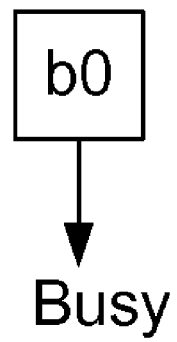

FIG. 15 shows a basic status register. It contains a single Busy bit to permit polling of the co-processor.

Figure 16:
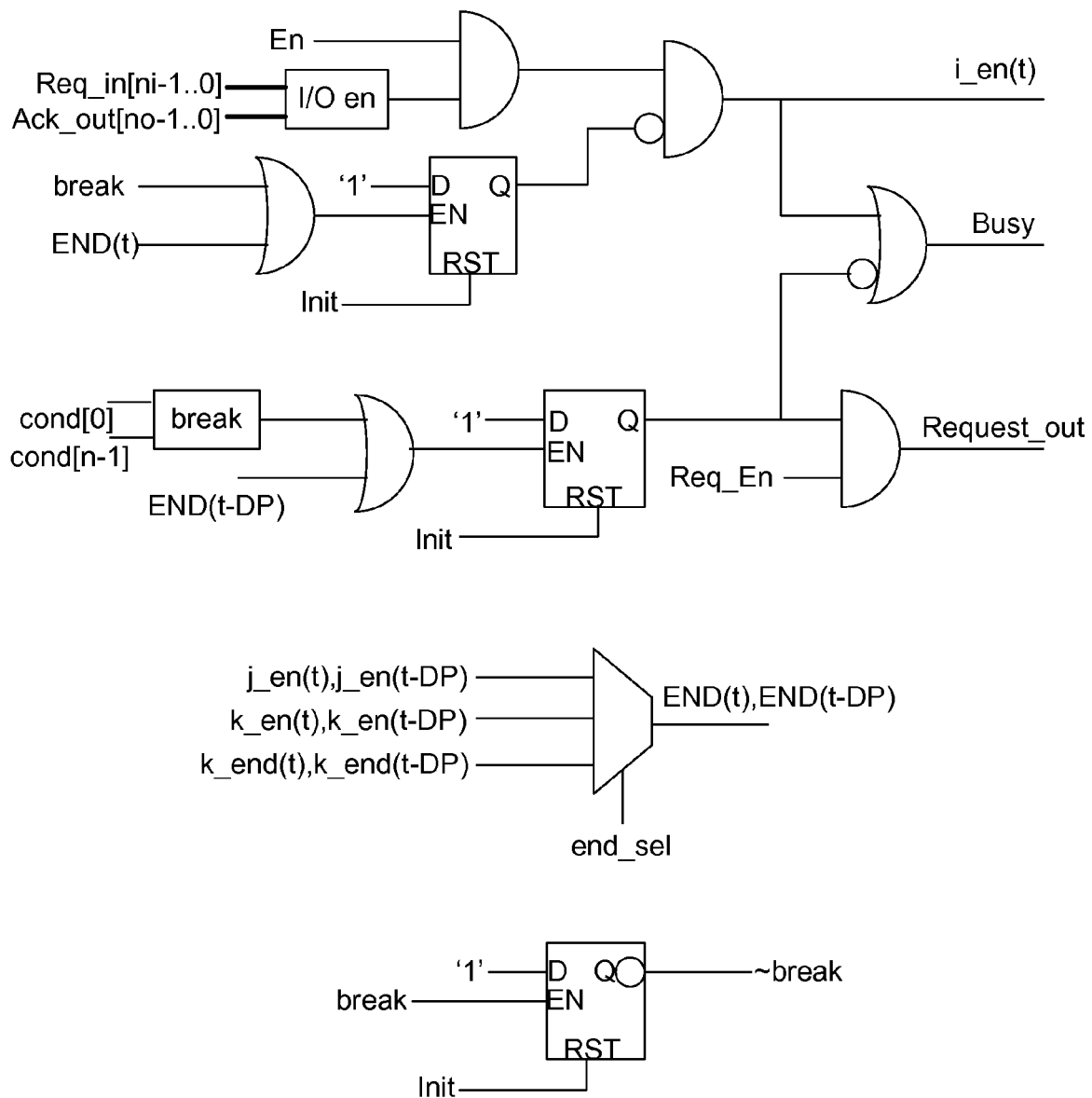

A basic control unit is shown in FIG. 16. The coprocessor is enabled whenever the control bit En and the I/O enable bit are asserted, and remains enables until either the END(t) or the break signals remains unasserted. Whenever these signals pulse, a logic '1' is caught in a flip-flop, which disables the coprocessor. An enabled co-processor has the innermost loop index active by asserting signal i_en(t), which in turn enables the outer loop indices and all the delayed versions of the enable groups.

If control output requests are enabled (Req_en='1') then the Request_out signal is asserted when either the break signal or the most delayed END(t-DP) pulses.

The END(t) and END(t-DP) signals are the wrap around signals of the outmost loop; a multiplexer uses signal end_sel explained in FIG. 4 to choose the index enable from signals i_en, j_en, or k_en, both the delay free and the delayed by DP cycles versions.

The Busy signal of the status register is generated as shown in FIG. 16. The coprocessor is busy if it is either enabled, with i_en(t) active, or has not finished the processing, i.e., END (t-DP) or break have not been asserted.

The break signal is used to disable the generation of loop index enables in the Delay Unit (FIG. 4). It is basically a registered inverted and one cycle delayed version of the break signal.

Figure 17:
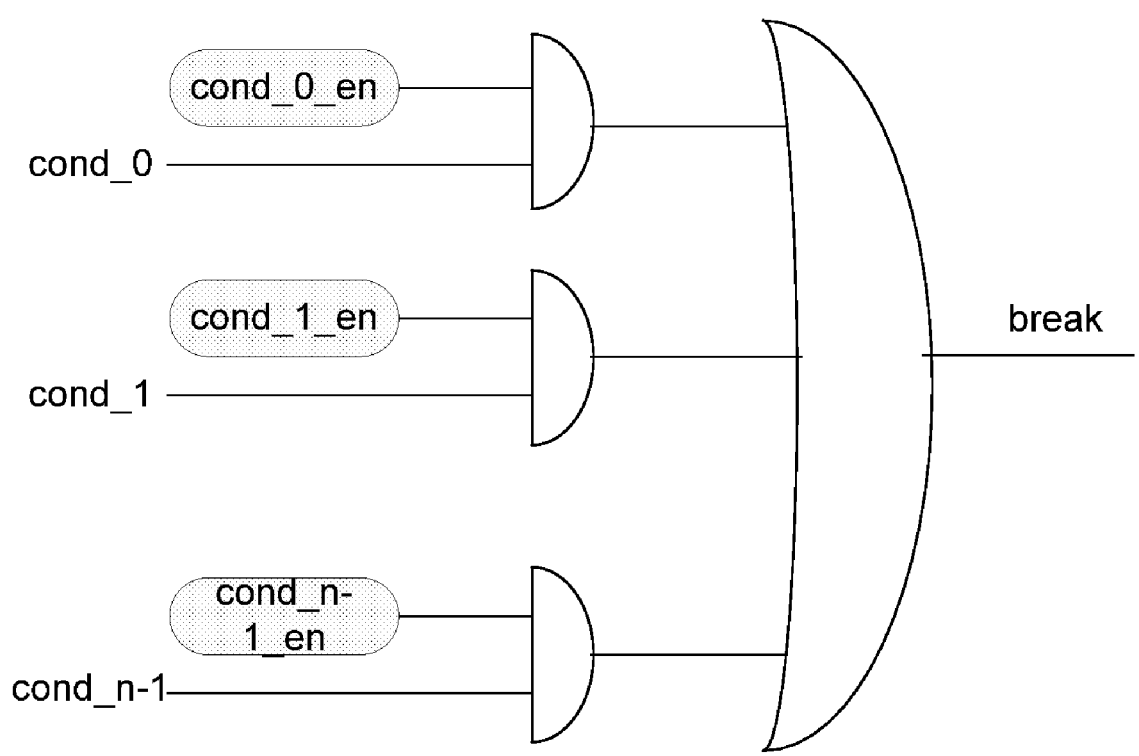

The selection of break conditions from functional units is illustrated in FIG. 17. For scalability reasons each functional i unit can only produce a single break condition signal cond_i. Internally, functional unit i may be programmed to fire the break condition for various reasons. However, from an external perspective, there is a single break signal per functional unit. A configuration bit cond_i_en tells whether break condition cond_i is enabled.

Figure 18:
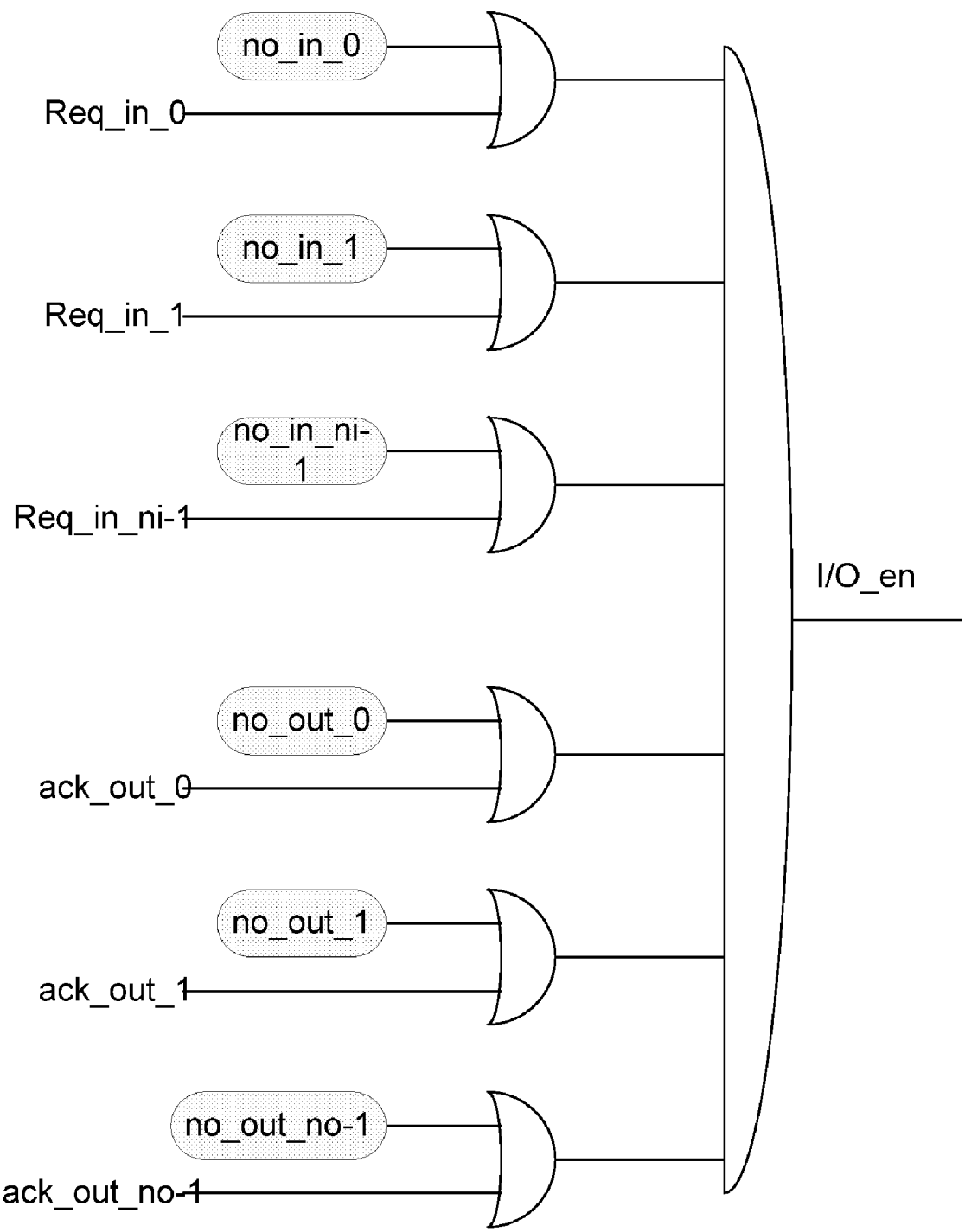

The selection of I/O dependent system enables is shown in FIG. 18. If the loop body expressions involve a system input i, then the co-processor can only be enabled if there is data available at that input, which is signaled by the Req_in_i signal. Similarly, if the results of the loop body expressions are being sent to system output j, then the co-processor can only be enabled if the data sent out is actually being read by another system, which is signaled by the Ack_out_j signal. When this signal is asserted it means that the data sent in the last cycle has been read. When asserted, configuration bits no_in_i and no_out_j indicate that system input i and system output j are not present in the loop body expressions, and therefore cannot disable the system.

C) Programming Tool

Figure 19:
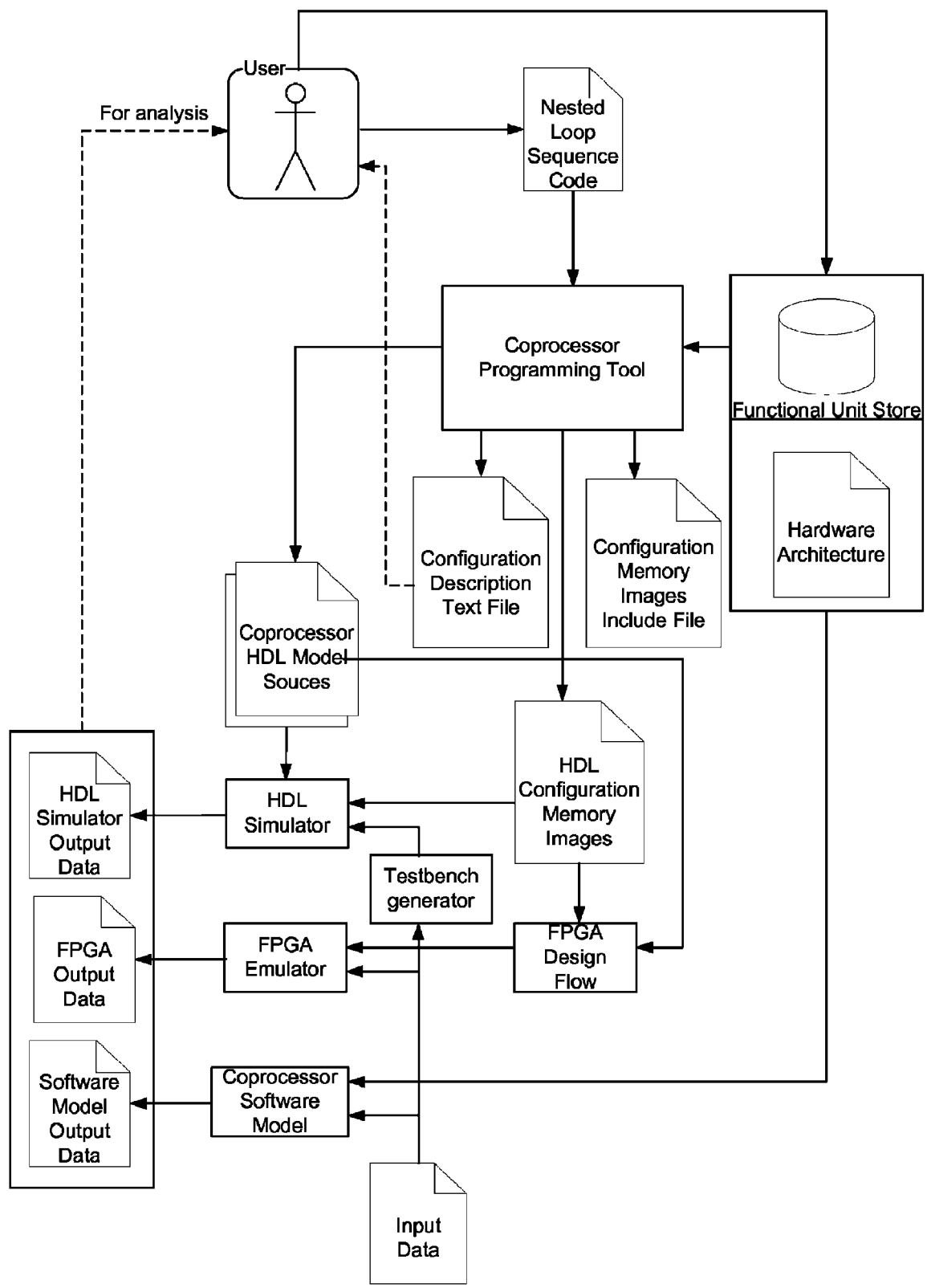

The coprocessor programming flow is illustrated in FIG. 19. The user starts by writing the nested loop sequence code according to the syntax given above. The coprocessor programming tool inputs the nested loop sequence code and a description of the hardware architecture, and outputs the coprocessor configuration sequences in multiple formats: text file, software include file and configuration memory images in Hardware Description Language (HDL). The text file is human readable and is used to give feedback to the user. The software include file contains the configuration memory images of the sequence; it can be included in some program which will configure and run the coprocessor. The HDL configuration images are used in FPGA emulation, for fast system verification, or HDL simulation for detailed system verification. Additionally, a software model of the architecture is compiled from the hardware description files, which provides a compromise between the speed of FPGA emulation and the detail of HDL simulation. The results (output data) produced by the software, HDL and FPGA models are analyzed by the user and used to guide the refinement of the input nested loop code.

The hardware architecture is described in a file which references the functional units used. The description of the functional units is placed in the functional unit store. The syntax of the hardware description file should be equivalent to the one given below:

```
//Constant declaration section
{({constant_name})}
//Input/output declaration section
{input input_name\[range\]}
{output output_name\[range\]}
range ::= integer..0
//Memory declaration section
{memory memory_name (singleport | twoport | dualport)
    addrA\[range\] dataA\[range\]
    [addrB\[range\] dataB\[rage\]]}
//Functional unit declaration section
{functional_unit functional_unit_name functional_unit_type}
//Read Crossbar declaration section
{functional_unit_name.input_name <=
    ({functional_unit_name.output_name})
    ({memory_name.(dataA | dataB)})
    ({constant_name})
//Write Crossbar declaration section
{output_name <= ({functional_unit_name.output_name})}
{memory_name.(data | dataB) <=
    ({functional_unit_name.output_name})}
//Address Generator declaration section
//Timing Unit
number_of_nested_loops := integer
number_of_enable_delay_groups := integer
//enable groups become named en_grp_0, en_grp_1, ..., up to
//en_grp_number_of_enable_delay_groups-1
//enabled signals in enable group I become named
//en_grp_i.en_0, en_grp_i.en_0, ..., up to
//en_grp_i.en_number_of_nested_loops-1
//Accumulators declaration section
number_of_baus := integer
number_of_caus := integer
//accumulators become named bau_0, bau_1, ..., up to
//bau_number_of_baus-1 or cau_0, cau_1, ..., up to
//cau_number_of_caus-1
//Enable Crossbar declaration section
{(bau | cau)_name.(en restart_en) <=
    ({en_grp_name.(en restart_en)})}
// Input Crossbar declaration section
{(bau | cau}_name.start <=
    ({bau_name.cnt_nxt} {constant_name})}
{(bau | cau)_name.incr <=
    ({bau_name.cnt} {constant_name})}
{cau_name.offset <= ({bau_name.cnt} {constant_name})}
// Output Crossbar declaration section
{memory_name.(addrA | addrB) <=
    ({cau_name.cnt} {memory_name.(data | dataB)})}
```

An example of an architecture description is the following:

```
//Input/output declaration section
input I0[31..0]
output O0[31..0]
//Memory declaration section
memory M0 dualport
    addrA[511..0],dataA[31..0] addrB[511..0] dataB[31..0]
memory M1 dualport
    addrA[511..0] dataA[31..0] addrB[511..0] dataB[31..0]
memory M2 dualport
    addrA[511..0] dataA[31..0] addrB[511..0] dataB[31..0]
//Functional unit declaration section
functional_unit ADD1 adder_32
functional_unit ADD2 adder_32
functional_unit MULT1 mult_32
functional_unit MULT2 mult_32
functional unit MUX mux_2_1_32
//Read Crossbar declaration section
ADD1.d_input0 <= (I0 M0.dataA M1.dataA MULT1.d_output)
ADD2.d_input1 <= (I0 M0.dataB const_rd MULT2.d_output)
MUX.s_input <= (ADD1.zero_flag ADD2.zero_flag)
MUX.d_input0 <= (MULT1.d_output M2.dataA)
MUX.d_input1 <= (MULT2.d_output M2.dataB)
//... and so on for other FUs
//Write Crossbar declaration section
O0 <= (ADD1.d_output MULT1.d_output)
M0.dataB <= (ADD1.d_output MULT1.d_output)
M1.dataB <= (ADD2.d_output MULT2.d_output)
//... and so on for other memory ports
//Address Generator declaration section
//Timing Unit
number_of_nested_loops := 3
number_of_enable_delay_groups := 3
//Accumulators declaration section
number_of_baus := 4
number_of_caus := 2
//Enable Crossbar declaration section
cau_0.(en restart_en) <= (en_grp_0.en_0 en_grp_1.en_1)
//... same for other baus and caus
bau_0.(en restart) <= (en_grp_1.en_1 en_grp_2.en_2)
//... same for other baus and caus
// Input Crossbar declaration section
bau_1.start <= (bau_2.cnt_nxt const_addr)
bau_1.incr <= (const_addr_incr bau_2.cnt)
cau_2.offset <= (const_addr_offset bau_3.cnt)
//... same for other baus and caus
// Output Crossbar declaration section
M0.addrA <= (cau_3.cnt cau_0.cnt M2.dataB)
//... same for other memories
```

The configuration description text file is written in syntax similar to the architecture description file but, instead of enumerating all possible sources for a destination, it specifies the selected source. In other words, it substitutes enumeration with exclusive disjunction. A description of a possible syntax follows:

```
{config_sequence}
config_sequence ::=
label: config_sequence begin {configuration} end
configuration ::=
configuration begin config_body end
config_body ::=
data_path_config addr_gen_config
data_path_config ::=
fu_config read_xbar_config write_xbar_config
fu_config ::=
{fu_name.parameter_name = parameter_value}
//parameter name and parameter value depend on the
//functional unit being used
read_xbar_config ::=
{functional_unit_name.input_name <=
(input_name | functional_unit_name.output_name |
memory_name.(dataA | dataB) | constant_name )}
write_xbar_config ::=
```

```
{memory_name.((dataA | dataB) write) <=
    functional_unit_name.(output_name (out_en|out_restart_en))}
{output_name.(data_out req_out) <=
    functional_unit_name.(output_name (out_en|out_restart_en))}
addr_gen_config ::=
    tu_config acc_config enable_xbar_config input_xbar_config
    output_xbar_config
tu_config ::= end_array delay_array
end_array ::= ({integer})
//list must have number_of_nested_loops elements
delay_array ::= ({integer})
//list must have number_of_enable_delay_groups elements
acc_config ::=
    cau_name.modulo = integer
enable_xbar_config ::=
    {(bau | cau)_name.(en restart_en) <=
        en_grp_name.(en_name en_name)}
input_xbar_config ::=
    (bau | cau)_name.start <=
        (constant_name | bau_name.cnt_nxt )
    (bau | cau)_name.incr <=
        (constant_name | (bau | cau)_name.cnt )
    cau_name.offset <= (constant_name | (bau | cau)_name.cnt)
output_xbar:config ::=
    memory_name.(addrA | addrB) <=
        ((bau | cau)_name.cnt | memory_name.(data | dataB))
```

The algorithm of the Coprocessor Programming Tool is outlined below.

```
coprocessorTool (nested_loop_sequence_code){
    SG = parseNLSC(nested_loop_sequence_code);
    nodeList = createNodelist(SG);
    HG = parseHW(architecture_description)
    if (map(nodeList.head, SG, HG) == true)
        writeConfigurationImages( );
        exit(SUCCESSFUL);
    else
        exit(UNSUCCESSFUL;)
}
```

The first step is there to analyze the expressions in the nested loop bodies and to create a complete system graph SG consisting of sub-graphs for each nested loop group. This is done by function parseNLSC (nested_loop_sequence_code). Each nested loop group gives rise to a configuration memory image. The sub-graph for each nested loop group has two parts: the data flow graph and the address flow graph.

The Data Flow Graph (DFG) has the following types of nodes:
Source Nodes:
  Memory node (data output ports)
  System data input node
  Configuration constant node
Sink Nodes:
  Memory node (data input ports)
  System data output node
Intermediate Nodes
  Functional unit node
The Address Flow Graph (AFG) has the following types of graphs:
Source Nodes:
  Memory node (data output ports)
  Timing unit node (enable signals output ports)
  Configuration constant node
Sink Nodes:
  Memory node (address input ports)
  System data input node (acknowledge signals)
Intermediate Nodes
  Accumulator unit node The edges in the DFG and AFG are directed from source nodes to intermediate nodes, from intermediate nodes to other intermediate nodes, and from intermediate nodes to sink nodes.

The DFG and the AFG can be concatenated in a single configuration graph CG by merging the memory sink nodes of the AFG with the memory source nodes of the DFG. The complete system graph SG can be constructed by concatenating successive CGs. One CG is concatenated with the next CG by merging the memory sink nodes of the current CG with the memory source nodes of the next CG. This allows leaving data in the embedded memories that will be used in the next co-processor configuration. This mechanism can be called a conscious or intentional caching mechanism, which should perform better than conventional caches which exploit stochastic locality.

The following example shows a nested loop group for which a CG is derived.

$$u = \alpha_0 * (i-8) + \beta 0$$
$$v = j$$
$$w = ((\alpha_1 * i + \beta_1) * j + \beta_2) \% \gamma) + \delta$$
$$x = M_2.dataA[j-5]$$
```
for(i=0; i<i_end; i++) {
    for(j=0; j<j_end; j++)
        d[u] += a[v]*b[w] + c[x];
}
```

Figure 20:
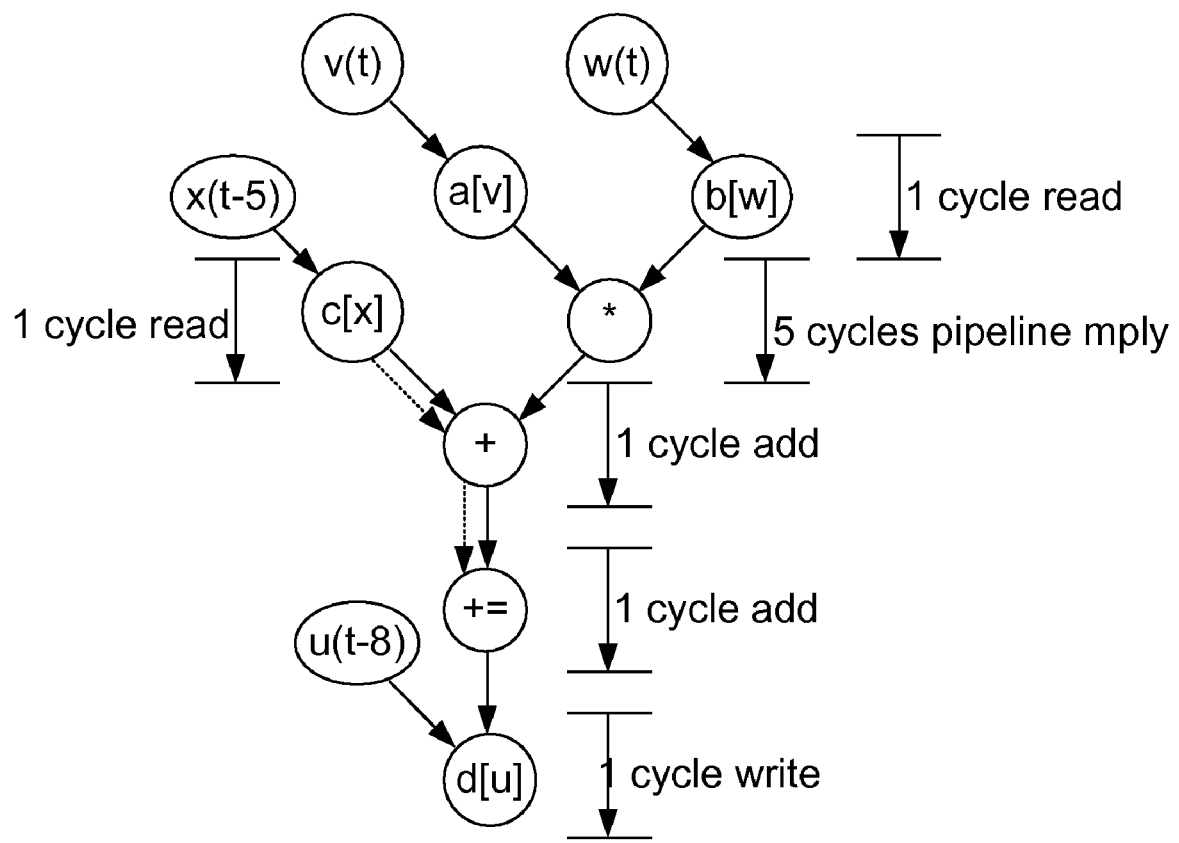

The DFG for the nested loop group in this example is shown in FIG. 20. As can be seen, the DFG follows the expression in the body of the nested loop group. Each node of the graph represents either an FU node or a memory node. Read, write or FU operations are pipelined and the latency for each operation is indicated in FIG. 20. The longest path in the graph, from memory reads a[v] or b[w] to memory write d[u] takes 9 cycles. The path from memory read c[x] to memory write d[u] takes 4 cycles. This means that memory read c[x] should be delayed 9−4=5 cycles relative to memory reads a[v] and b[w] and that memory write d[u] should be delayed 9−1=8 cycles relative to memory reads a[v] and b[w]. With the presented architecture template there are no delays in computing the addresses. Thus differences in latency come only from FUs with different number of pipeline stages. However, extending this methodology to the case where the computation of addresses is affected by latency is straightforward.

Figure 21:
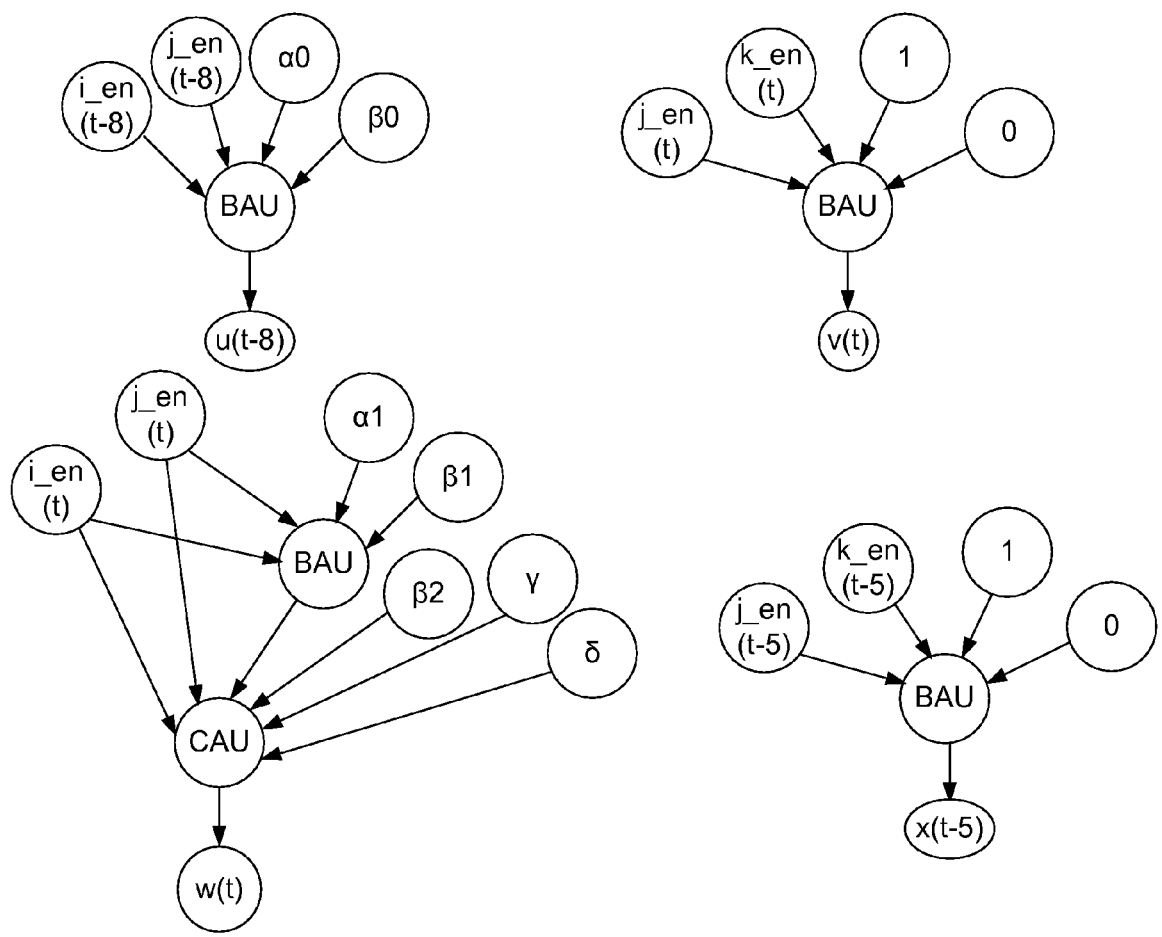

The AFG for computing the addresses u, v, w and x is shown in FIG. 21. The computation of addresses advances with the enable signals i_en and j_en generated by the Timing Unit. The addresses that need to be delayed D cycles use a delayed enable group with signals i_en(t-D) and j_en(t-D). Note that address u, v and x need only one BAU to be computed, whereas address w is more complex and needs a CAU fed by a BAU.

Concatenating the DFG and the AFG by merging homonym memory nodes u(t-8), v(t), w(t), and x(t-5) yields the CG for the nested loop group in this examples. Had there been a sequence of nested loop groups, the respective CGs would be concatenated in a similar way to yield the complete SG.

Having created SG, the nodes in this graph are ordered in a list, in a breadth first fashion, from the system output nodes towards the system input nodes. For the example given the order of nodes could be: d[u], +−, +, c[x], *, x(t-5), a[v], b[w], v(t) and w(t). This is what the function createNodelist (SG) in the main algorithm flow does.

Next, function parseHW(architecture_description) creates a graph that describes the hardware by means of function. The hardware graph follows the architectural description given above. Some hardware nodes map to SG nodes: I/O, memory, functional unit, address accumulators, configuration constants, timing unit nodes; other hardware nodes have no correspondence to nodes in SG, but are useful for routing signals: memory port, crossbar multiplexer, functional unit port. The selections of paths all the way up from system outputs and memory inputs up to system inputs and memory outputs, passing through several levels of functional units, constitute the data for each configuration. Unfolding the hardware graph as many times as the number of configurations gives us the complete hardware graph HG, onto which SG is mapped.

The next step is to map the nodes in SG to nodes in HG. The recursive map procedure is outlined below.

```
bool map (node, SG, HG){
    descendantHwNodes =
        getHwNodes(node.getDescendants( ), HG);
    candidateHwNodes =
        descendantHwNodes.getHwCommonAscendants(HG);
    if (candidateHwNodes == null)
        return(false);
    foreach hwNode in candidateHwNodes {
        if (hwNode.type != node.type)
            next;
        if(hwNode.isUsed( ))
            next;
        hwNode.route(descendantHwNodes, HG);
        if(node.next == null)
            return(true);
        if((map(node.next, SG, HG))
            return(true);
        hwNode.unroute(descendentHwNodes, HG);
    }
    return false;
}
```

Following the pseudo-code above, the first thing to do when mapping an SG node to a HG node is to get the immediate descendant nodes of that node in the graph. These nodes have already been mapped to a HG node, since the algorithm proceeds from graph sinks to graph sources. Working from the descendant HG nodes, one computes the list of common immediate ascendant HG nodes which have correspondence in SG and are reachable by unused multiplexers. This is a list of possible HG nodes that can be mapped to the node in question. The nodes in this list are searched to find suitable candidates. First, the candidate HG node must be of the same type as the node: adder, multiplier, memory, etc. Second, the node must not be in use. If either of these tests fail the procedure returns unsuccessfully. Having performed these checks, the HG node is routed to its descendants, that is, the input multiplexers of the descendants are set to receive data from the node. If this is the last node to be mapped the procedure returns success. Otherwise, the map procedure is recursively applied to the next node in SG. If successful, the procedure returns success. Otherwise it means that the mapping of the next nodes can not be accomplished with the current mapping of the current or previous nodes. In this case the routes to the descendants are undone and the next candidate HG node is tried. After all candidate nodes are tried unsuccessfully the procedure returns unsuccessfully.

An example of application of a reconfigurable coprocessor instance created with the present invention is presented next. The example is a MPEG 1 layer III (MP3) decoder algorithm. The algorithm has been run on (1) a conventional processor and on (2) the same conventional processor accelerated by a coprocessor instance. The processor is a 32-bit Harvard architecture with 0.81 DMIPS of performance. The coprocessor instance has been generated with the following parameterization: 2 nested loops, 32-bit data path, 2 adders/accumulators, 2 multipliers/shifters, 3 dual port memory blocks totalling 4 kbytes of ROM and 8 kbytes of RAM.

The experimental results from running a set of MP3 benchmarks are shown in Table 1. From the initial profiling of the algorithm on the conventional processor we find that two procedures are taking 95% of the time: the Polyphase Synthesis and the Inverse Modified Discrete Cosine Transform (IMDCT). Thus, if we accelerate these procedures in the coprocessor the potential for acceleration is 20. The Polyphase Synthesis procedure has been accelerated 18.7 times on average. The IMDCT procedure has been accelerated 43.9 times on average. This resulted in an overall algorithm acceleration of 11.9 times. The profiling of the complete system formed by the processor and coprocessor reveals a more balanced processing load distribution among the main procedures. In the complete system the Polyphase Synthesis and IMDCT procedures account for only 34% of the processing load, in stark contrast to the 95% processing load before acceleration.

TABLE 1

MP3 results

|  | Polyphase Synthesis | IMDCT | Other procedures | Total |
|---|---|---|---|---|
| Profiling on processor (%) | 24 | 71 | 5 | 100 |
| Speed-up | 18.7 | 43.9 | 1 | 11.9 |
| Profiling on processor + coprocessor (%) | 15 | 19 | 66 | 100 |

In this example the silicon area doubled as the result of adding the coprocessor instance. Since the performance has been multiplied by twelve, this means that the processor-coprocessor system dissipates roughly 6 times less power, while still keeping the same level of performance.

It must be clear that the present reconfigurable coprocessor architecture template merely states the principles of the invention. Variations and modifications to the cited architecture can be made without moving away from the scope and principles of the invention. All these modifications and variations must be enclosed in the scope of the present invention and protected by the following claims.

REFERENCES

[1] Katherine Compton, Scott Hauck, Reconfigurable computing: a survey of systems and software, ACM Computing Surveys (CSUR), v. 34 n. 2, p. 171-210, June 2002.

[2] A. Abnous, "Low-Power Domain-Specific Processors for Digital Signal Processing," PhD thesis, Dept. of EECS, UC Berkeley, Calif., USA, 2001.

[3] T. Miyamori, K. Olukotun, "REMARC: Reconfigurable Multimedia Array Coprocessor," IEICE Trans. on information and Systems, vol. E82-D, No. 2, February 1999, pp. 389-397.

[4] John Reid Hauser, John Wawrzynek, Augmenting a microprocessor with reconfigurable hardware, 2000.

[5] Seth Copen Goldstein, Herman Schmit, Matthew Moe, Mihai Budiu, Srihari Cadambi, R. Reed Taylor, Ronald Laufer, PipeRench: a co/processor for streaming multimedia acceleration, Proceedings of the 26th annual international symposium on Computer architecture, p. 28-39, May 1-4, 1999, Atlanta, Ga.

[6] Hartej Singh, Ming-Hau Lee, Guangming Lu, Nader Bagherzadch, Fadi J. Kurdahi, Eliseu M. Chaves Filho, MorphoSys: An Integrated Reconfigurable System for Data-Parallel and Computation-Intensive Applications, IEEE Transactions on Computers, v. 49 n. 5, p. 465-481, May 2000.

[7] Ahmad Alsolaim, Janusz Starzyk, Jürgen Becker Manfred Glesner, Architecture and Application of a Dynamically Reconfigurable Hardware Array for Future Mobile Communication Systems, Proceedings of the 2000 IEEE Symposium on Field-Programmable Custom Computing Machines, p. 205, Apr. 17-19, 2000.

[8] Reiner W. Hartenstein, Rainer Kress, A datapath synthesis system for the reconfigurable datapath architecture, Proceedings of the 1995 conference on Asia Pacific design automation (CD-ROM), p. 77-es, Aug. 29-Sep. 1, 1995, Makuhari, Massa, Chiba, Japan.

[9] Elliot Waingold, Michael Taylor, Devabhaktuni Srikrishna, Vivek Sarkar, Walter Lee, Victor Lee, Jang Kim, Matthew Frank, Peter Finch, Rajeev Barua, Jonathan Babb, Saman Amarasinghe, Anant Agarwal, Baring It All to Software: Raw Machines, Computer, v. 30 n. 9, p. 86-93, September 1997.

[10] E. Mirsky, A. DeHon, "MATRIX: A Reconfigurable Computing Architecture with Configurable Instruction Distribution and Deployable Resources," FCCM '96-IEEE Symposium on FPGAs for Custom Computing Machines, Napa, Calif., April 1996.

[11] Alan Marshall, Tony Stansfield, Igor Kostarnov, Jean Vuillemin, Brad Hutchings, A reconfigurable arithmetic array for multimedia applications, Proceedings of the 1999 ACM/SIGDA seventh international symposium on Field programmable gate arrays, p. 135-143, Feb. 21-23, 1999, Monterey, Calif.

[12] R. D. Witting and P. Chow, OneChip: An FPGA processor with reconfigurable logic. In Proceedings of the IEEE Symposium on FPGAs for Cistom Computing Machines (FCCM'96), pages 126-135, 1996.

[13] J. M. Rabaey, "Reconfigurable Computing: The Solution to Low Power Programmable DSP", Proceedings 1997 ICASSP Conference, Munich, April 1997.

[14] Ebeling, C., Cronquist, D., and Franklin, P. 1996 RaPID—Reconfigurable Pipelined Datapath. In the $6^{th}$ International Workshop on Field-Programmable Logic and Applications.

[15] R. Razdan and M. D. Smith. High-performance microarchitectures with hardware-programmable functional units. In Proceedings of the IEEE/ACM International Symposium on Mircoarchitecture, pages 172-180, 1994.

[16] C. R. Rupp, M. Landguth, T. Garverick, E. Gomersall, H. Holt, J. M. Arnold, and M. Gokhale. The NAPA adaptive processing architecture. In Porceedings of the IEEE Symposium on FPGAs for Custom Computing Machines (FCCM'98), pages 28-37, 1998.

[17] Salvatore M. Carta, Danilo Pani, Luigi Raffo. Reconfigurable Coprocessor for Multimedia Application Domain, In Journal of VLSI Signal Processing 44, 135-152, 2006.

[18] CHAMELEON SYSTEMS, Inc. 2000. CS2000 Advance Product Specification. Chameleon Systens Inc., Sna Jose, Calif.

[19] Pact XPP Technologies, "XPP-III Processor Overview (White Paper)", July 2006.

The invention claimed is:

1. An architecture template of a reconfigurable coprocessor, specialized in computing nested loops of expressions containing arithmetic and logic operations, comprising:
   a linear array of unspecified number and type of reconfigurable, pipelined or not, functional units, which are to be chosen according to the application domain;
   a linear array of unspecified number and type of embedded memories to store intermediate data and address calculations;
   a reconfigurable address generator block to compute complex sequences of addresses for the embedded memories;
   a partial and reconfigurable read crossbar, defined at pre-synthesis time, to connect system inputs, memory data output ports, and programmed constants to the functional unit inputs;
   a partial and reconfigurable write crossbar, defined at pre-synthesis time, to connect functional unit outputs to system outputs or memory data input ports;
   a register file containing control, status, and configuration registers, where the configuration registers store the configuration of the reconfigurable functional units, reconfigurable address generator block, partial and reconfigurable connection crossbars and further stores constants used in the data and address calculations.

2. The architecture template of a reconfigurable coprocessor for nested loops according to claim 1, wherein the reconfigurable address generator block comprises:
   a control unit to start, halt and resume the generation of addresses, which causes the coprocessor to start, halt and resume execution, accordingly;
   a programmable timing unit to generate the enable signals which are used for: timely generation of addresses to index arrays stored in the various embedded memories, timely activating functionalities in the functional units and timely requesting system outputs and memory writes;
   a linear array of programmable accumulators which are interconnected to generate complex address sequences;
   a partial and reconfigurable enable crossbar, defined at pre-synthesis time, to connect the enable signals to the accumulators in the array, and to acknowledge the reading of external data at the system inputs;
   a partial and reconfigurable input crossbar, defined at pre-synthesis time, to connect accumulator outputs and configuration constants to other accumulator inputs;
   a partial and reconfigurable output crossbar, defined at pre-synthesis time, to connect accumulator outputs, which form the generated addresses, and respective enable signals to memory address ports, and routing memory data ports to memory address ports in the case of addresses stored in memory.

3. The reconfigurable address generator block according to claim 2, wherein the programmable timing unit comprises:
   a matrix of programmable counters, where each row produces a group of enable signals characterized by having the same delay in cycles and the number of columns represents the maximum number of nested loops the coprocessor can do, where all counters in a column are programmed with the same end limit, determining the number of iterations of the loop they control;
   an encoder to determine the actual number of nested loops in a given configuration, using the number of programmed columns;

a delay unit to delay the global enable signal up to a maximum permitted delay, and output enable signals with a programmed delay for each enable group, including the delay free enable and the maximum delay in the current configuration, which may be different from the maximum permitted delay in the architecture.

4. The programmable timing unit according to claim 3, wherein the enable signals produced by the matrix of programmable counters are used to delay data streams relative to each other and compensate for different latencies in the data flow graph introduced by functional units with different delays, and performs the following actions: times the reading of data from inputs or memories; accompanies the data through functional units where enables and data are delayed equally; times the writing of data to outputs or memories.

5. The reconfigurable address generator block according to claim 2, wherein the programmable accumulators comprise:
   an input signal specifying the start value of the accumulator, where this input may be driven by another accumulator or by a configuration constant via the input crossbar;
   an input signal specifying the increment value of the accumulator, where this input may be driven by another accumulator or by a configuration constant via the input crossbar;
   an enable signal to enable the operation of the accumulator;
   a restart enable signal to reload the start value;
   an input signal specifying the offset value of the accumulator if the accumulator is a complex accumulator unit, where this input may be driven by another accumulator or by a configuration constant via the input crossbar;
   a configuration register specifying the modulo value of the accumulator if the accumulator is a complex accumulator unit;
   an output accumulated value to be used as the generated address or the input of another accumulator.

6. The architecture template of a reconfigurable coprocessor for nested loops according to claim 1, wherein the configuration, status and control register file comprises:
   an addressable, read/write memory mapped interface, which enable fine granularity partial reconfiguration at runtime;
   an output request signal to inform or ask for external assistance.

7. The architecture template of a reconfigurable coprocessor for nested loops according to claim 1, wherein each functional unit in the functional unit array issues a break signal able to stop the coprocessor.

8. The architecture template of a reconfigurable coprocessor for nested loops according to claim 1, wherein the multiple system inputs are slave request/acknowledge interfaces and the multiple system outputs are master request/acknowledge interfaces.

9. The architecture template of a reconfigurable coprocessor for nested loops according to claim 8, wherein the absence of system input requests or system output acknowledges will stall the coprocessor if the expressions being executed read data from system inputs and/or write data to system outputs.

10. The reconfigurable address generator block according to claim 2, wherein the control unit enables and disables the coprocessor, terminates the processing when the outmost loop index wraps around, halts the coprocessor on input data starving, output data overflow, or when one or more break conditions from functional units fire.

11. A coprocessor programming tool for the architecture template of claim 1, comprising:
   a compiler of the architecture description of the coprocessor;
   a parser for the nested loop sequences, tagged and rewritten in the original program for a conventional processor, and using syntax essentially similar to that of a conventional programming language;
   a compiler for the code of a nested loop sequence, which converts it to a particular configuration of the coprocessor.

12. An architecture description file following the hardware architectural template of claim 1, comprising
   the description of the number and type of reconfigurable functional units;
   the number, type, data and address widths of embedded memories;
   the description of the reconfigurable address generator block;
   the description of the reconfigurable read and write crossbars.

13. The architecture description file of claim 12, wherein the description of the reconfigurable address generation block comprises:
   the description of the programmable timing unit block;
   the description of the number and type of programmable accumulators;
   the description of the reconfigurable enable, input and output crossbars.

14. The description of the reconfigurable address generation block of claim 13, wherein the description of the programmable timing unit comprises:
   the description of the number of nested loops in a group;
   the description of the number of different delayed versions of the enable signal to be generated.

15. A configuration description file according to the architecture description file of claim 12, comprising
   the description of the configuration of the functional units in terms of parameter/value pairs;
   the configuration of the embedded memories in terms of read or write modes implicitly inferred from whether the ports are connected to functional unit inputs or outputs;
   the description of the configuration of the reconfigurable address generator block;
   the description of the configuration of the reconfigurable read and write crossbars.

16. The configuration description file of claim 15, wherein the description of the configuration of the reconfigurable address generation block comprises:
   the description of the configuration of the programmable timing unit block;
   the description of the configuration of each programmable accumulator;
   the description of the configuration of the enable, input and output crossbars.

17. The description of the reconfigurable address generation block of claim 16, wherein the description of the programmable timing unit configuration comprises:
   the description of the end limits of each nested loop;
   the description of the number of cycle delays for each enable signal group.

18. The description of the reconfigurable address generation block of claim 16, wherein the description of the programmable accumulators comprises:
   the start and increment values if connected to configuration constants;
   the offset value if the accumulator is a complex accumulator unit and the offset input is connected to configuration constant;

the modulo value if the accumulator is a complex accumulator unit.

19. The coprocessor programming tool of claim 11, comprising:
- a function to parse the arithmetic and logic expressions in the nested loop bodies to derive a complete system graph;
- a function to create an ordered list of system graph nodes, which will be mapped to a hardware graph that represents the architecture in that order;
- a function to parse the architecture description file of claim 13, and produce the hardware graph;
- a function to recursively map each node in the system graph to a node in the hardware graph.

20. The coprocessor programming tool of claim 19, wherein the system graph comprises a sequence of configuration sub-graphs, wherein each configuration graph corresponds to a nested loop group.

21. The system graph of claim 20, wherein each configuration sub-graph comprises:
- a data flow sub-graph;
- an address flow sub-graph.

22. The configuration graph of claim 21 wherein the data flow sub-graph comprises:
- sources nodes: memory node (data output ports), system data input node, configuration constant nodes;
- sink nodes: memory node (data input ports), system data output node;
- intermediate node: functional unit node.

23. The configuration graph of claim 21 wherein the address flow sub-graph comprises:
- sources: memory node (data output ports), timing unit node (enable signals output ports), configuration constant node;
- sink nodes: memory node (address input ports), system data input node (acknowledge signals);
- intermediate node: accumulator unit node.

24. The architecture template of claim 1, wherein each data expression in the nested loop bodies consists of an assignment of a variable or array to a logic and arithmetic expression involving variables, arrays or configuration constants.

25. The data expressions of claim 23, wherein the index of each array must have the form $((alpha*i+beta)\% gamma)+delta$, where i is the loop variable and alpha, beta, gamma and delta can be recursively defined by expressions of the same form using loop variables inner to i.

26. The coprocessor programming tool of claim 19, wherein the function to recursively map a node in the system graph to a node in the hardware graph proceeds as follows: creates a list of all candidate hardware nodes which can be mapped to a given system node; tentatively maps the system node to each candidate hardware node and recursively tries to map the next system node in the list; if successful it keeps the current mapping and returns true; if unsuccessful it tries the next candidate hardware node; if all candidates are tried unsuccessfully it returns false.

27. The architecture template of claim 1, wherein at most as many memory accesses as memory data ports can be performed in parallel and in a single cycle, and all functional units can produce results in parallel and in a single cycle.

28. The architecture template of claim 1, wherein the performance of the system can be scaled by increasing the number of functional units and embedded memories, while keeping the sparse links in the connection crossbars to avoid clock period increase.

29. The architecture template of claim 1, wherein the resulting coprocessors are connected either synchronously or using asynchronous first in first out memories FIFOs, forming a globally asynchronous locally synchronous system.

* * * * *